(12) United States Patent
Aoki et al.

(10) Patent No.: US 7,525,750 B2
(45) Date of Patent: *Apr. 28, 2009

(54) HEAD RETRACTING APPARATUS, STORAGE DEVICE, AND HEAD RETRACTING METHOD

(75) Inventors: Takahiro Aoki, Kawasaki (JP); Takeshi Hara, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

This patent is subject to a terminal disclaimer.

(21) Appl. No.: 11/583,694

(22) Filed: Oct. 18, 2006

(65) Prior Publication Data

US 2007/0291393 A1 Dec. 20, 2007

(30) Foreign Application Priority Data

Jun. 14, 2006 (JP) .............................. 2006-165232

(51) Int. Cl.
G11B 21/02 (2006.01)

(52) U.S. Cl. ..................................................... 360/75

(58) Field of Classification Search .................. 360/75, 360/69, 55, 60, 77.02, 78.04
See application file for complete search history.

(56) References Cited

U.S. PATENT DOCUMENTS

| | | | |
|---|---|---|---|
| 6,771,449 B1 | 8/2004 | Ito et al. | |
| 6,995,939 B2 | 2/2006 | Ito et al. | |
| 7,369,345 B1* | 5/2008 | Li et al. | 360/75 |
| 7,379,260 B2* | 5/2008 | Aoki et al. | 360/75 |
| 2005/0099719 A1 | 5/2005 | Katai et al. | |

FOREIGN PATENT DOCUMENTS

| | | |
|---|---|---|
| JP | 2002-8336 | 1/2002 |
| JP | 2002-174641 | 6/2002 |
| JP | 2002-208239 | 7/2002 |
| JP | 2003-263240 | 9/2003 |
| JP | 2005-114402 | 4/2005 |

* cited by examiner

*Primary Examiner*—Fred Tzeng
(74) *Attorney, Agent, or Firm*—Greer, Burns & Crain, Ltd.

(57) ABSTRACT

A head retracting apparatus retracts a head on a storage medium upon detecting a fall. A counter-value calculating unit calculates a counter value that changes with an increase of a falling time and an increase of a non-falling time. A retraction determining unit determines whether to retract the head, based on the calculated counter value.

6 Claims, 4 Drawing Sheets

HEAD RETRACTING APPARATUS, STORAGE DEVICE, AND HEAD RETRACTING METHOD

BACKGROUND OF THE INVENTION

1. Field of the Invention

The present invention relates to a technology for retracting a head on a storage medium by detecting a strong impact, with a capability of preventing unnecessary head retraction.

2. Description of the Related Art

A magnetic disk drive is mainly used as an auxiliary storage device of a general-purpose computer and for a business-purpose device that requires high-capacity random access data recording. Furthermore, use of the magnetic disk drive as a general household appliance has increased recently, with an advance of digitalization of household appliances and an increase of applications to record data such as audio-visual data as digital data (for example, a hard disk video recorder and a portable music reproducing device).

However, when the magnetic disk drive receives a strong impact due to a fall, a head collides with a disk surface and the disk surface gets scratched, and data reading and writing may become impossible. Particularly, falls of the magnetic disk drive while it is in operation cause the magnetic disk drive to become easily out of order. Therefore, when handling a product that includes a magnetic disk drive for a portable application, an attention had to be paid to avoid giving a strong impact to the product.

Japanese Patent Application Laid-Open No. 2002-8336 discloses a technology that uses a fall sensor to prevent damages caused by falls of the magnetic disk drive and retracts the head from the disk surface when a free fall of the magnetic disk drive is detected.

However, with the conventional technology, the performance of the magnetic disk drive may be degraded because of erroneous detections of the falls caused by sudden disturbances and periodic vibrations, which always leads to a retraction of the head from the disk surface.

SUMMARY OF THE INVENTION

It is an object of the present invention to at least partially solve the problems in the conventional technology.

A head retracting apparatus according to one aspect of the present invention retracts a head on a storage medium upon detecting a fall. The head retracting apparatus includes a counter-value calculating unit that calculates a counter value that changes with an increase of a falling time and an increase of a non-falling time; and a retraction determining unit that determines whether to retract the head, based on the calculated counter value.

A storage device according to another aspect of the present invention retracts a head on a storage medium upon detecting a fall. The storage device includes a counter-value calculating unit that calculates a counter value that changes with an increase of a falling time and an increase of a non-falling time; and a retraction determining unit that determines whether to retract the head, based on the calculated counter value.

A head retracting method according to still another aspect of the present invention is for retracting a head on a storage medium upon detecting a fall. The head retracting method includes calculating a counter value that changes with an increase of a falling time and an increase of a non-falling time; and determining whether to retract the head, based on the calculated counter value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
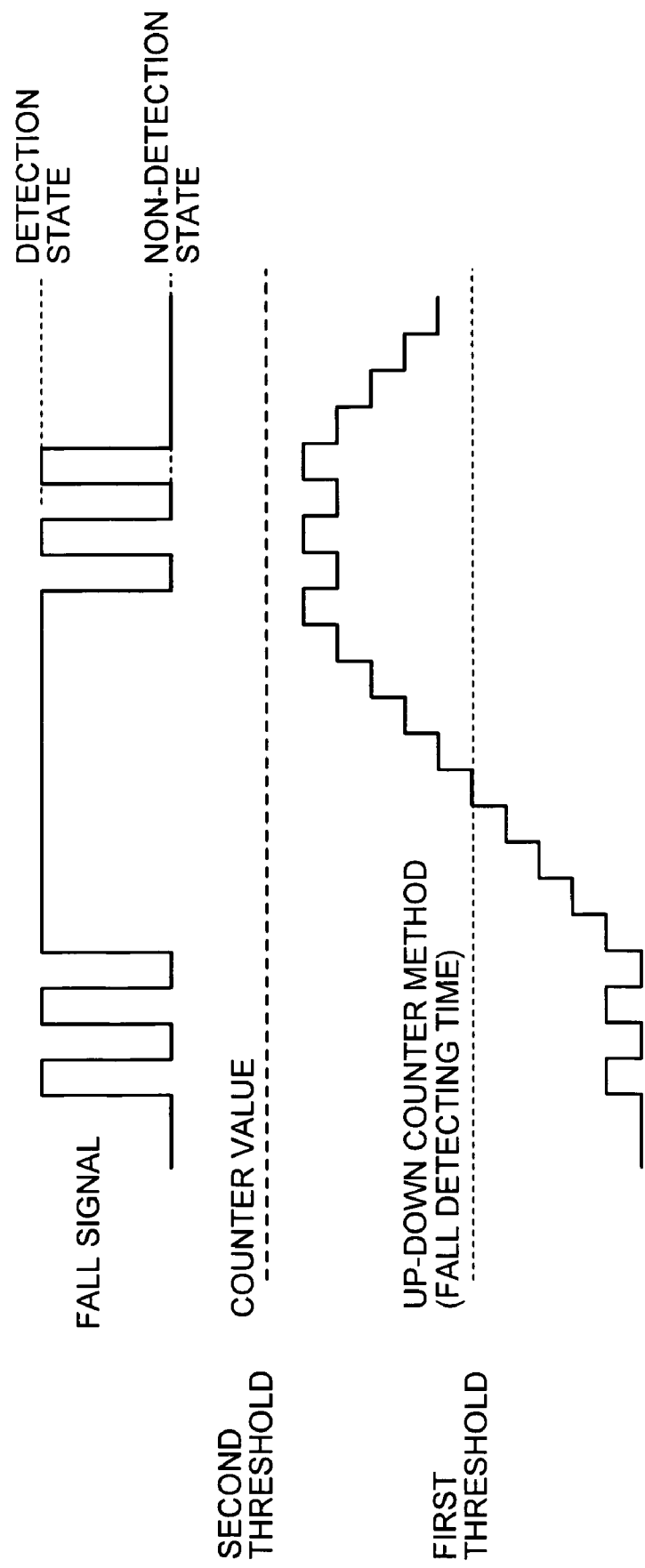
FIG. 1 is a schematic diagram for explaining an outline and features of a magnetic disk drive according to an embodiment of the present invention.

An outline and features of a magnetic disk drive 100 according to an embodiment of the present invention will be explained. FIG. 1 is an explanatory view that explains the outline and features of the magnetic disk drive 100 according to the present embodiment. As shown in FIG. 1, the magnetic disk drive 100 acquires a fall signal from a fall sensor that indicates whether the magnetic disk drive 100 is falling and that calculates a counter value based on the fall signal. The counter value is a value to which a falling time of the magnetic disk drive 100 is accumulated and a non-falling time of the magnetic disk drive 100 is subtracted (the method of calculating the counting value hereinafter is referred to as "up-down counter method"). The magnetic disk drive 100 retracts a head when the calculated counter value exceeds a predetermined value (in the example shown in FIG. 1, when the counter value exceeds the first threshold and the second threshold).

The magnetic disk drive 100 can precisely determine whether to retract the head and unnecessary head retractions can be prevented even if the fall sensor erroneously detects falls affected by sudden disturbances, etc., since the magnetic disk drive 100 calculates the counter value that changes as the falling time and the non-falling time increase and determines whether to retract the head based on the calculated counter value.

Figure 2:
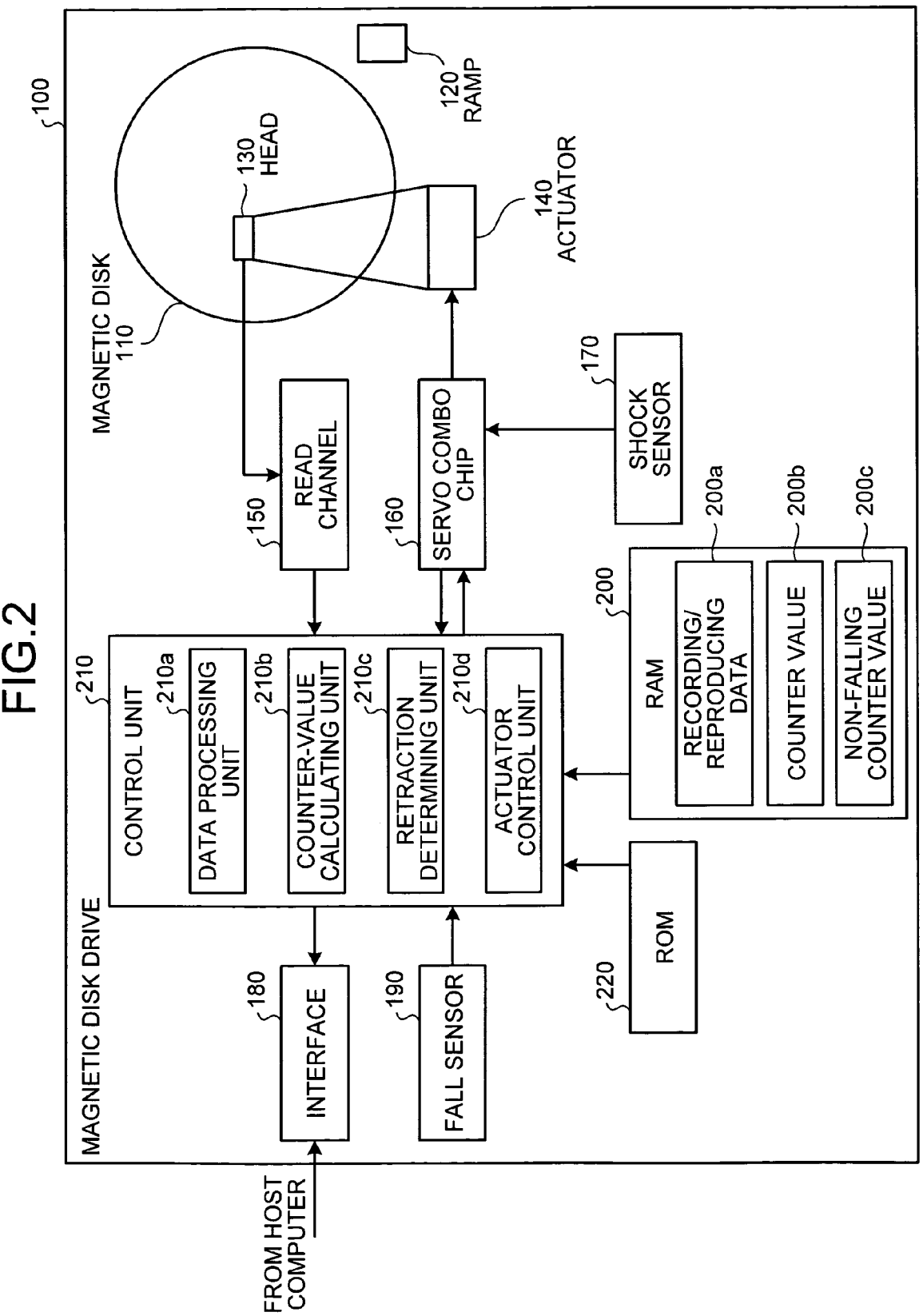
FIG. 2 is a functional block diagram of a configuration of the magnetic disk drive according to the present embodiment.

A configuration of the magnetic disk drive 100 according to the present embodiment will then be explained. FIG. 2 is a functional block diagram of a configuration of the magnetic disk drive 100. As shown in FIG. 2, the magnetic disk drive 100 is configured to include a magnetic disk 110, a ramp 120, a head 130, an actuator 140, a read channel 150, a servo combo chip 160, a shock sensor 170, an interface 180, a fall sensor 190, a random access memory (RAM) 200, a control unit 210, and a read only memory (ROM) 220. Other configurations are similar to the configurations of a general magnetic disk drive with a Load/Unload method, and will not be explained.

The magnetic disk 110 is a recording medium forming a magnetic film on a metal or glass disk-shaped substrate. To record data on the magnetic disk 110, a magnetic field is radiated from the head 130 to a recording area that records data of the magnetic disk 110, and the magnetization state of the magnetic film of the magnetic disk 110 is changed. To reproduce the data from the magnetic disk 110, the head 130 is moved to a recording area on the magnetic disk 110 to be reproduced and the magnetization state of the magnetic film of the magnetic disk 110 is read.

The magnetic disk 110 is provided with a fixed cylinder (or unload cylinder). When the magnetic disk drive 100 retracts the head 130 to the ramp 120, the magnetic disk drive 100 first moves the head 130 to the fixed cylinder provided at the magnetic disk drive 100, and then retracts the head 130 to the ramp 120. The distance between the position of the fixed cylinder provided at the magnetic disk drive 100 and the position of the ramp 120 is maintained constant. The ramp 120 is a part that stops the head 130 during retractions.

The head 130 is a device that records and reproduces data to and from the magnetic disk 110. The head 130 reads a servo signal that controls a track position, etc, from the magnetic disk 110 and outputs to the read channel 150 the servo signal with reproduction data reproduced from the magnetic disk 110.

The actuator 140 is a device that includes a voice coil motor (VCM) and that moves the head 130 with a control current outputted from the servo combo chip 160. The read channel 150 is a device that acquires reproduction data and the servo signal from the head 130, and outputs the acquired reproduction data and servo signal to the control unit 210.

The servo combo chip 160 is a device that outputs the control current to the actuator 140 following instructions from the control unit 210 and that controls the movement of the head 130. The servo combo chip 160 also outputs the control current to a spindle motor not shown and that controls the rotation of the magnetic disk 110.

The shock sensor 170 is a sensor that detects shocks given to the magnetic disk drive 100. The shock sensor 170 outputs information of the detected shocks to the control unit 210 through the servo combo chip 160.

The interface 180 is a device that controls communication with a host computer not shown in the drawings. The fall sensor 190 is a sensor that detects free falls of the magnetic disk drive 100 in all three-axis (X-Y-Z) directions, and outputs a fall signal indicating whether the magnetic disk drive 100 is falling to the control unit 210. When the magnetic disk drive 100 is falling, the fall signal is "high", and when the magnetic disk drive 100 is not falling, the fall signal is "low".

The RAM 200 is a device that stores data necessary for various processes by the control unit 210, and particularly, the RAM 200 deeply related to the present invention stores recording/reproducing data 200a, a counter value 200b, and a non-falling counter value 200c.

The recording/reproducing data 200a is data acquired from the host computer that is to be recorded on the magnetic disk 110 or data reproduced from the magnetic disk 110. The magnetic disk drive 100 first stores the data to be recorded on the magnetic disk 110 and the data to be reproduced from the magnetic disk 110 to the RAM 200.

The counter value 200b is a value that changes as the falling time and the non-falling time of the magnetic disk drive 100 increase. Specifically, as the falling time of the magnetic disk drive 100 increases, a predetermined value is added (accumulated) to the counter value 200b, and as the non-falling time of the magnetic disk drive 100 decreases, a predetermined value is subtracted from the counter value 200b. The head 130 is retracted to the ramp 120 when a value of the counter value 200b exceeds a predetermined threshold.

Figure 3:
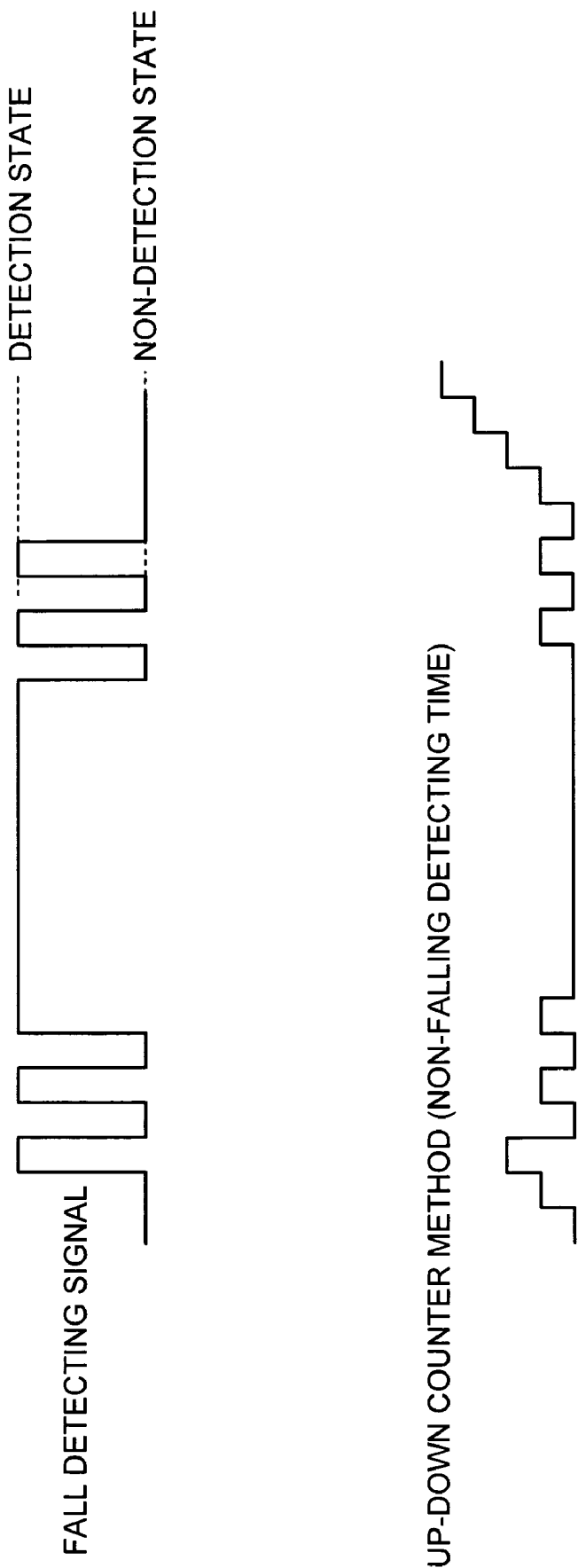
FIG. 3 is a schematic diagram for explaining changes in a non-falling counter value.

The non-falling counter value 200c is a value of the non-falling time of the magnetic disk drive 100. FIG. 3 is an explanatory view that explains changes in the non-falling counter value 200c. As shown in FIG. 3, a predetermined value is added to the non-falling counter value 200c as the non-falling time of the magnetic disk drive increases, and when the magnetic disk drive 100 falls, the non-falling counter value 200c is set back to the initial value. The processes can be simplified since the addition is used to count the non-falling counter value 200c and the non-falling counter value 200c never becomes negative.

The control unit 210 is a device that executes various processes using programs and control data that provide various procedures stored in the ROM 220, and particularly, the control unit 210 deeply related to the present invention includes a data processing unit 210a, a counter-value calculating unit 210b, a retraction determining unit 210c, and an actuator control unit 210d.

The data processing unit 210a is a processing unit that records data acquired from the host computer to the recording/reproducing data 200a. The data processing unit 210a also acquires data (such as data reproduced from the magnetic disk 110) from the recording/reproducing data 200a complying with a request from the host computer and outputs the data to the host computer.

The counter-value calculating unit 210b is a processing unit that acquires the fall signal from the fall sensor 190 and that calculates the counter value 200b and the non-falling counter value 200c as the falling time and the non-falling time of the magnetic disk drive 100 increase. Specifically, the counter-value calculating unit 210b accumulates a predetermined value (for example, 1) to the counter value 200b as the falling time increases, and subtracts a predetermined value (for example, 1) to the counter value 200b as the non-falling time increases.

The counter-value calculating unit 210b adds a predetermined value (for example, 1) to the non-falling counter value 200c as the non-falling time increases, and sets back the non-falling counter value 200c to the initial value when the magnetic disk drive 100 starts to fall.

The retraction determining unit 210c is a processing unit that determines whether to retract the head 130 by comparing a first threshold value and a second threshold value to the counter value 200b. Specifically, the retraction determining unit 210c determines to move the head 130 to the fixed cylinder when the counter value 200b exceeds the first threshold, and determines to move the head 130 from the fixed cylinder to the ramp 120 when the counter value 200b exceeds the second threshold.

The retraction determining unit 210c monitors the state of the magnetic disk drive 100, referring to the non-falling counter value 200c. If the non-falling counter value 200c continues to increase, then the magnetic disk drive 100 is not falling.

The actuator control unit 210d is a processing unit that outputs a control command to the servo combo chip 160 based on the determination result of the retraction determining unit 210c and that moves the head 130 to the predetermined position. Specifically, the actuator control unit 210d outputs the control command to the servo combo chip 160 and moves the head 130 to the fixed cylinder when the retraction determining unit 210c determines to move the head 130 to the fixed cylinder.

The actuator control unit 210d outputs a control command to the servo combo chip 160 and retracts the head 130 from the fixed cylinder to the ramp 120 when the retraction determining unit 210c determines to retract the head 130 from the fixed cylinder to the ramp 120. The actuator control unit 210d moves the head 130 to the predetermined area of the magnetic disk 110 when data recording or data reproducing to and from the magnetic disk 110 is executed.

Figure 4:
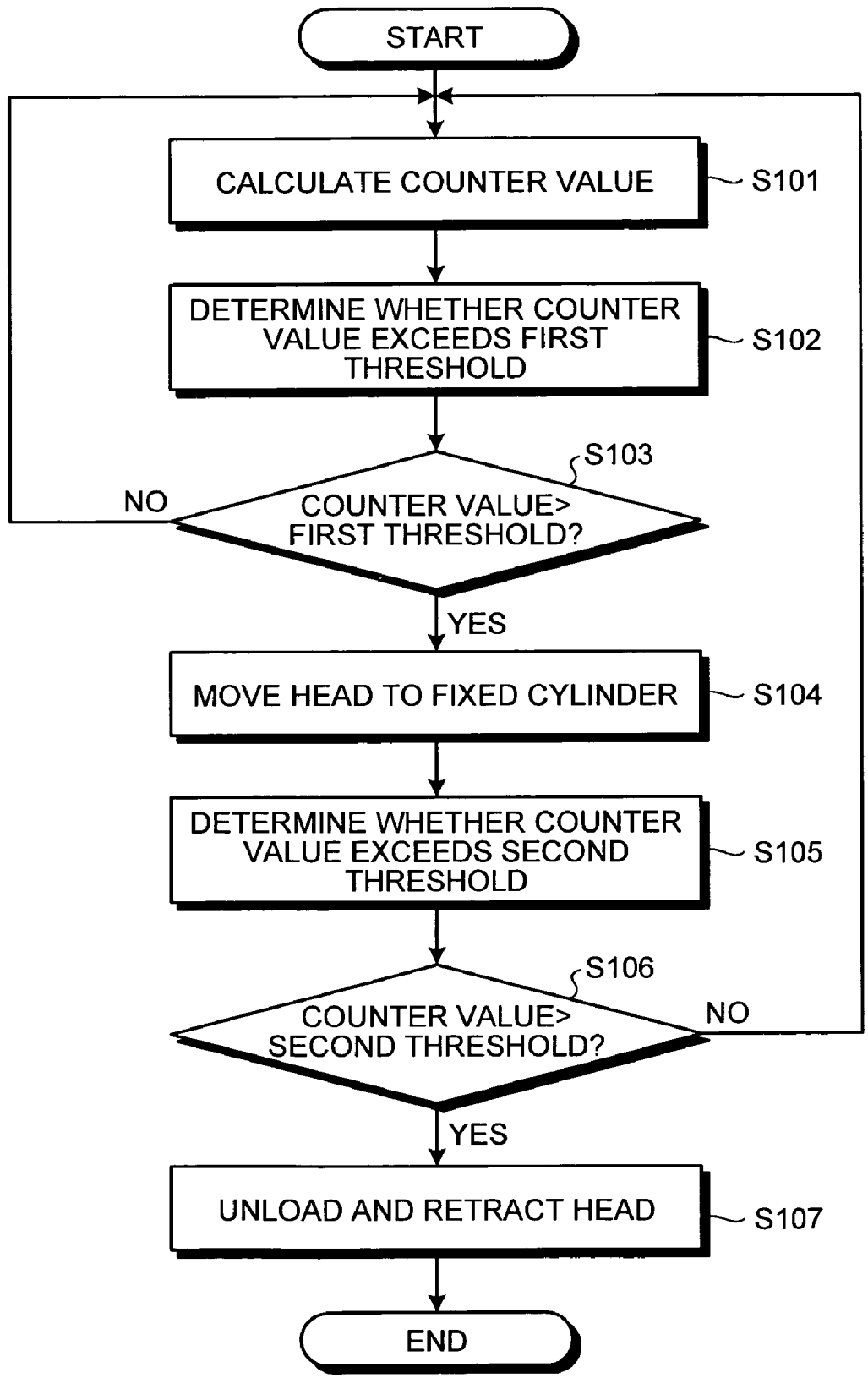
FIG. 4 is a flowchart of a processing procedure of the magnetic disk drive according to the present embodiment.

A process of the magnetic disk drive 100 according to the present embodiment will then be explained. FIG. 4 is a, flowchart of a processing procedure of the magnetic disk drive 100 according to the embodiments. As shown in FIG. 4, in the magnetic disk drive 100, the counter-value calculating unit 210b acquires the fall signal from the fall sensor 190 and calculates the counter value 200b (step S101), and the retraction determining unit 210c determines whether the counter value 200b exceeds the first threshold (step S102).

When the counter value 200b does not exceed the first threshold (step S103, No), the process is moved to the step S101, and when the counter value 200b exceeds the first threshold (step S103, Yes), the actuator control unit 210d moves the head 130 to the fixed cylinder (step S104).

The retraction determining unit 210c determines whether the counter value 200b exceeds the second threshold (step S105). When the counter value 200b does not exceed the second threshold (step S106, No), the process is moved to the step S101, and when the counter value 200b exceeds the second threshold (step S106, Yes), the actuator control unit 210d retracts the head 130 from the fixed cylinder to the ramp 120 (step S107).

Unnecessary head retractions can be prevented since the counter-value calculating unit 210b calculates the counter value 200b based on the fall signal inputted from the fall sensor 190 and the retraction determining unit 210c determines whether to retract the head by comparing the counter value 200b to the first threshold and the second threshold.

As described above, the magnetic disk drive 100 according to the present embodiment acquires the fall signal from the fall sensor 190, the fall signal indicating whether the magnetic disk drive 100 is falling. The counter-value calculating unit 210b then calculates the counter value based on the fall signal (accumulates the falling time and subtracts the non-falling time). Unnecessary head retractions can be prevented since the retraction determining unit 210c determines whether to retract the head by comparing the calculated counter value to the first and second thresholds, and the retraction determining unit 210c can precisely determine whether to retract the head even if the fall sensor erroneously detects falls due to sudden disturbances.

By preventing unnecessary retractions, the head conducting data recording and data reproducing will not be retracted, and therefore the performance of the magnetic disk drive 100 can be improved.

The various processes described in the embodiments can be realized by executing prepared programs with a central processing unit (CPU) installed in a magnetic disk drive (computer) or with processing devices such as a micro control unit (MCU) and a micro processing unit (MPU). In the example of FIG. 2, various programs that realize the various processes are stored in the ROM 220, and the various processes that realize functions of the various processing units (the data processing unit 210a, the counter-value calculating unit 210b, the retraction determining unit 210c, and the actuator control unit 210d) are activated with the control unit 210 reading and executing the various programs recorded in the ROM 220.

The various programs are not necessarily to be stored in the ROM from the beginning. For example, the various programs can be stored in "portable physical media" such as a flexible disk (FD), a CD-ROM, a DVD disk, a magneto-optical disk, and an IC card that are inserted to computers, or in "fixed physical media" such as a hard disk drive (HDD) provided inside and outside of computers, or in "other computers (or servers)" that are connected to computers through public lines, Internet, LAN, WAN, etc., and the computers can read the various programs from the media and execute the various programs.

Although the embodiments of the present invention are explained thus far, other than the above embodiments, the present invention can be implemented in different embodiments within the technical scope of the claims.

All or some of the processes in the embodiments that are explained to be executed automatically can be executed manually, or all or some of the processes that are explained to be executed manually can be executed automatically with known methods.

The information including processing procedures, controlling procedures, specific names, and various data and parameters in the above document and drawings can arbitrarily be modified if not otherwise specified.

The components of the devices in the drawings are functional and conceptual, and the components are not necessarily to be physically configured as in the drawings. Specific configurations of distribution and integration of the devices are not limited to the configurations in the drawings, and all or some of the configurations can be configured by functionally or physically distributing and integrating in arbitrary units, in compliance with various loads and usage statuses.

All or arbitrary parts of processing functions conducted by the devices can be realized by a CPU (MCU, MPU) and programs analyzed and executed by the CPU (MCU, MPU), or can be realized as a hardware with a wired logic.

As described above, according to an embodiment of the present invention, head retractions by erroneous fall detections can be prevented and the performance can be improved since the counter value that changes as the falling time and the not-falling time increase is calculated, and whether to retract the head is determined based on the calculated counter value.

Furthermore, according to an embodiment of the present invention, whether the head retraction is conducted can be precisely determined since the predetermined value is added to the counter value as the falling time increases and the predetermined value is subtracted from the counter value as the not-falling time increases.

Moreover, according to an embodiment of the present invention, processes can be simplified since the predetermined value is added to the not-falling counter value indicating the not-falling time as the not-falling time increases, and when a fall is detected, the not-falling counter value is set back to the initial value, and the not-falling counter value never becomes negative.

Furthermore, according to an embodiment of the present invention, it is possible to prevent degradation in performance that occurs when sudden disturbances are erroneously detected as falls. When the head retraction apparatus, the storage device, and the head retraction method according to the present invention are applied to devices such as computers and home appliances, the devices can be used at ease without worrying about vibrations or shakes, therefore the present invention can increase the utility value of the devices.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head retracting apparatus that retracts a head on a storage medium upon detecting a fall, the head retracting apparatus comprising:

a counter-value calculating unit that calculates a counter value that changes with an increase of a falling time and an increase of a non-falling time; and a retraction determining unit that determines whether to retract the head, based on the calculated counter value, wherein the counter-value calculating unit adds a predetermined value to the counter value with increase of the falling time, and subtracts a predetermined value from the counter value with the increase of the non-falling time.

2. The head retracting apparatus according to claim 1, further comprising:

a non-falling-time monitoring unit that monitors the non-falling time, wherein the non-falling-time monitoring unit adds a predetermined value to a non-falling counter value indicating the non-falling time with the increase of the non-falling time, and resets the non-falling counter value to an initial value when the fall is detected.

3. A storage device that retracts a head on a storage medium upon detecting a fall, the storage device comprising:

a counter-value calculating unit that calculates a counter value that changes with an increase of a falling time and an increase of a non-falling time; and a retraction determining unit that determines whether to retract the head, based on the calculated counter value, wherein the counter-value calculating unit adds a predetermined value to the counter value with increase of the falling time, and subtracts a predetermined value from the counter value with the increase of the non-falling time.

4. The storage device according to claim 3, further comprising:

a non-falling-time monitoring unit that monitors the non-falling time, wherein the non-falling-time monitoring unit adds a predetermined value to a non-falling counter value indicating the non-falling time with the increase of the non-falling time, and resets the non-falling counter value to an initial value when the fall is detected.

5. A head retracting method of retracting a head on a storage medium upon detecting a fall, the head retracting method comprising:

calculating a counter value that changes with an increase of a falling time and an increase of a non-falling time; and determining whether to retract the head, based on the calculated counter value, wherein:

the calculating includes:

adding a predetermined value to the counter value with increase of the falling time; and subtracting a predetermined value from the counter value with the increase of the non-falling time.

6. The head retracting method according to claim 5, further comprising:

monitoring the non-falling time, wherein the monitoring includes:

adding a predetermined value to a non-falling counter value indicating the non-falling time with the increase of the non-falling time; and resetting the non-falling counter value to an initial value when the fall is detected.

* * * * *